(12) United States Patent
Brown et al.

(10) Patent No.: US 10,856,194 B2
(45) Date of Patent: Dec. 1, 2020

(54) CELLULAR HANDOVER

(71) Applicant: British Telecommunications Public Limited Company, London (GB)

(72) Inventors: Ruth Brown, London (GB); Maria Cuevas, London (GB)

(73) Assignee: British Telecommunications Public Limited Company, London (GB)

( * ) Notice: Subject to any disclaimer, the term of this patent is extended or adjusted under 35 U.S.C. 154(b) by 120 days.

(21) Appl. No.: 15/540,912

(22) PCT Filed: Dec. 29, 2015

(86) PCT No.: PCT/EP2015/081379
§ 371 (c)(1),
(2) Date: Jun. 29, 2017

(87) PCT Pub. No.: WO2016/107886
PCT Pub. Date: Jul. 7, 2016

(65) Prior Publication Data
US 2017/0347298 A1    Nov. 30, 2017

(30) Foreign Application Priority Data

Dec. 30, 2014  (EP) .................................... 14250123

(51) Int. Cl.
*H04W 4/00* (2018.01)
*H04W 36/00* (2009.01)
(Continued)

(52) U.S. Cl.
CPC ... *H04W 36/0083* (2013.01); *H04W 36/0066* (2013.01); *H04W 36/00835* (2018.08);
(Continued)

(58) Field of Classification Search
CPC ....... H04W 36/0083; H04W 36/00835; H04W 36/0066; H04W 36/14; H04W 36/245; H04W 36/30
See application file for complete search history.

(56) References Cited

U.S. PATENT DOCUMENTS 9,253,704 B1 * 2/2016 Sarkar .................. H04W 36/00
9,713,059 B2   7/2017 Ramirez et al.
(Continued)

FOREIGN PATENT DOCUMENTS

EP    2 775 760 A1    9/2014
EP    2775760 A1 *   9/2014   ........ H04W 36/0094

OTHER PUBLICATIONS

Samsung (Method and apparatus for service continuity to mobile, May 16, 2014) (Year: 2014).*
(Continued)

*Primary Examiner* — Maharishi V Khirodhar
(74) *Attorney, Agent, or Firm* — Patterson Thuente Pedersen, P.A.

(57) ABSTRACT

In a cellular communications network, user equipment connected to a base station, the active mode handover behavior of the base station for selecting handover targets is set to be different from idle mode reselection. The MME provides its eNodeBs with supplemental information about other PLMNs which can be considered for handover in accordance with dynamic criteria such as the time, location, subscriber group, etc to allow dynamic handover to other PLMNs in accordance with the commercial agreements.

4 Claims, 7 Drawing Sheets

(51) Int. Cl.
*H04W 36/14* (2009.01)
*H04W 36/24* (2009.01)
*H04W 36/30* (2009.01)

(52) U.S. Cl.
CPC ......... *H04W 36/14* (2013.01); *H04W 36/245* (2013.01); *H04W 36/30* (2013.01)

(56) References Cited

U.S. PATENT DOCUMENTS

| | | | |
|---|---|---|---|
| 9,883,436 B2 | 1/2018 | Brown et al. | |
| 2008/0227453 A1 | 9/2008 | Somasundaram et al. | |
| 2009/0086672 A1 | 4/2009 | Gholmieh et al. | |
| 2009/0141683 A1* | 6/2009 | Grinshpun | H04W 60/06 370/331 |
| 2009/0286525 A1* | 11/2009 | Kesavan | H04W 48/08 455/419 |
| 2010/0210268 A1* | 8/2010 | Lim | H04W 48/20 455/436 |
| 2011/0117916 A1* | 5/2011 | Dahlen | H04W 48/08 455/436 |
| 2013/0017826 A1* | 1/2013 | Bergquist | H04W 12/08 455/426.1 |
| 2013/0121182 A1* | 5/2013 | Hegge | H04W 36/14 370/252 |
| 2013/0150039 A1* | 6/2013 | Ramle | H04W 36/0061 455/436 |
| 2014/0204908 A1* | 7/2014 | Keller | H04W 36/0022 370/331 |
| 2014/0213256 A1* | 7/2014 | Meylan | H04W 48/18 455/436 |
| 2015/0045025 A1* | 2/2015 | Lim | H04W 36/20 455/434 |
| 2015/0172975 A1* | 6/2015 | Hansson | H04W 36/0083 455/436 |
| 2015/0223160 A1* | 8/2015 | Ho | H04W 48/20 370/338 |
| 2015/0358477 A1* | 12/2015 | Jeong | H04W 40/24 370/259 |
| 2017/0094570 A1* | 3/2017 | Kim | H04W 36/08 |
| 2017/0359759 A1 | 12/2017 | Brown et al. | |

OTHER PUBLICATIONS

International Search Report for corresponding International Application No. PCT/EP2015/081379 dated Mar. 4, 2016; 4 pages.

Written Opinion of the International Searching Authority for corresponding International Application No. PCT/EP2015/081379 dated Mar. 4, 2016; 9 pages.

Alcatel-Lucent, "Selection of Target PLMN in case of Shared HeNB," 3GPP Draft; R3-120771_RANSHRG, 3$^{rd}$ Generation Partnership Project (3GPP), vol. RAN WG3, No. San Jose del Cabo, Mexico (Mar. 26-30, 2012); XP050669122; 3 pages. http://www.3gpp.org/ftp/tsg_ran/WG3_Iu/TSGR3_75bis/Docs/ Retrieved on Apr. 2, 2012.

Huawei, "Discussion on RAN sharing for H(e)NB," 3GPP Draft; R3-112779_DISC_RANSHARING, 3$^{rd}$ Generation Partnership Project (3GPP), vol. RAN WG3, No. San Francisco, USA (Nov. 14-18, 2011); XP050566020; 4 pages.

U.S. Appl. No. 15/540,981, filed Jun. 29, 2016, Inventor(s): Brown et al.

Application and Filing Receipt for U.S. Appl. No. 15/127,555, filed Sep. 20, 2016, Inventor(s): Brown et al.

Application and Filing Receipt for U.S. Appl. No. 15/101,776, filed Jun. 3, 2016, Inventor(s): Ramirez et al.

Alcatel Lucent, Wi-Fi Roaming—Building on ANDSF and Hotspot2. 0, (Feb. 27, 2012) XP002677915; pp. 1-45. http://www.alcatel-lucent.com.

European Telecommunications Standards Institute (ETSI), Technical Specification "Universal Mobile Telecommunications System (UMTS); Access Network Discovery and Selection Function (ANDSF) Management Object (MO) (3GPP TS 24.312 version 12.6.1 Release 12)," (Oct. 1, 2014) vol. 3GPP CT 1, No. V12.6.1, XP014223573; 356 pages.

\* cited by examiner

1
CELLULAR HANDOVER

CROSS-REFERENCE TO RELATED APPLICATIONS

The present application is a National Phase entry of PCT Application No. PCT/EP2015/081379, filed on 29 Dec. 2015, which claims priority to EP Patent Application No. 14250123.8, filed on 30 Dec. 2014, which are hereby fully incorporated herein by reference.

TECHNICAL FIELD

The present disclosure relates to cellular telecommunications and in particular to a method and apparatus for mobile device handover.

BACKGROUND

In "Long-Term Evolution" (LTE) cellular networks, wide area macrocell devices are known as eNodeBs and transmit LTE signals over large geographic areas. Due to range limitations, a number of eNodeBs are deployed such that the edges of coverage overlap so that continuous coverage can be achieved.

User devices, such as cellular telephones, tablets and computers with cellular network adaptors, known as User Entities (UEs) connect to an eNodeB in order to access the cellular network.

In LTE, the UE has three valid states: switched off, idle mode and active mode. Switched off represents being completely disconnected from the cellular network. In active mode, the UE is actively engaged in a communication session with another correspondent node via the eNodeB and the LTE network core. In idle mode, the UE is not actively transmitting or receiving, but is connected to an eNodeB and ready to switch to connected mode to enable a communication session, e.g. making a voice call or starting a data session.

In active mode, the eNodeBs are responsible for UE mobility in a process called handover. The eNodeBs instruct the connected UE in active mode to send measurement reports about neighboring eNodeBs and when certain thresholds and conditions are met, the eNodeB will select a target eNodeB for handover and initiate the handover on behalf of the UE. In general, each eNodeB is configured to follow the same set of rules and thresholds for handover so that all UEs are handed over in the same way but decisions are dependent on the observed variables.

The handover criteria used by an eNodeB to decide whether to handover to a different eNodeB is typically static. In particular, surrounding eNodeBs of the UE are only considered if the target eNodeBs have the same Public Land Mobile Network (PLMN) name or are defined as being equivalent in the equivalent PLMN (ePLMN) list.

An ePLMN may apply for example where a PLMN is formed of two or more merged networks such as the UK network Everything Everywhere formed of T-Mobile and Orange where the individual cells are still configured to carry the original MCC and MNC information. In this case, the ePLMN list will include entries for all of the different MCC and MNC combinations which are to be considered as part of the same network.

However, the ePLMN and associated Handover Restriction List is not flexible and does not allow selective handover to non-equivalent PLMNs.

Embodiments of the present disclosure address this issue.

SUMMARY

In one aspect, an embodiment of the present disclosure provides a method of inter network cellular device handover between a plurality of cellular communications networks, each network having at least one base station carrying an identifier for its respective network, the method comprising a base station of one of said networks performing the following: requesting a measurement report from a connected cellular device; accessing a permissions list associated with the cellular device, the list defining permissions for handover to a different cellular networks; determining which cellular networks are permitted in accordance with the permissions and current operating parameters of the cellular device; selecting a target base station of a different cellular network; and establishing communication with the selected base station to handover the cellular device.

In another aspect, an embodiment of the present disclosure provides apparatus for providing inter network cellular device handover between a plurality of cellular communications networks, each network having at least one base station carrying an identifier for its respective network, the apparatus being connected to a cellular devices and comprising: means for requesting a measurement report from the connected cellular device; accessing means for accessing a permissions list associated with the cellular device, the list defining permissions for handover to a different cellular networks; means for determining which cellular networks are permitted in accordance with the permissions and current operating parameters of the cellular device; means for selecting a target base station of a different cellular network; and handover means for establishing communication with the selected base station to handover the cellular device.

Further aspects are set out in the dependent claims.

BRIEF DESCRIPTION OF THE DRAWINGS

Embodiments of the present disclosure will now be explained accompanied by the following figures in which.

DESCRIPTION

Figure 1:
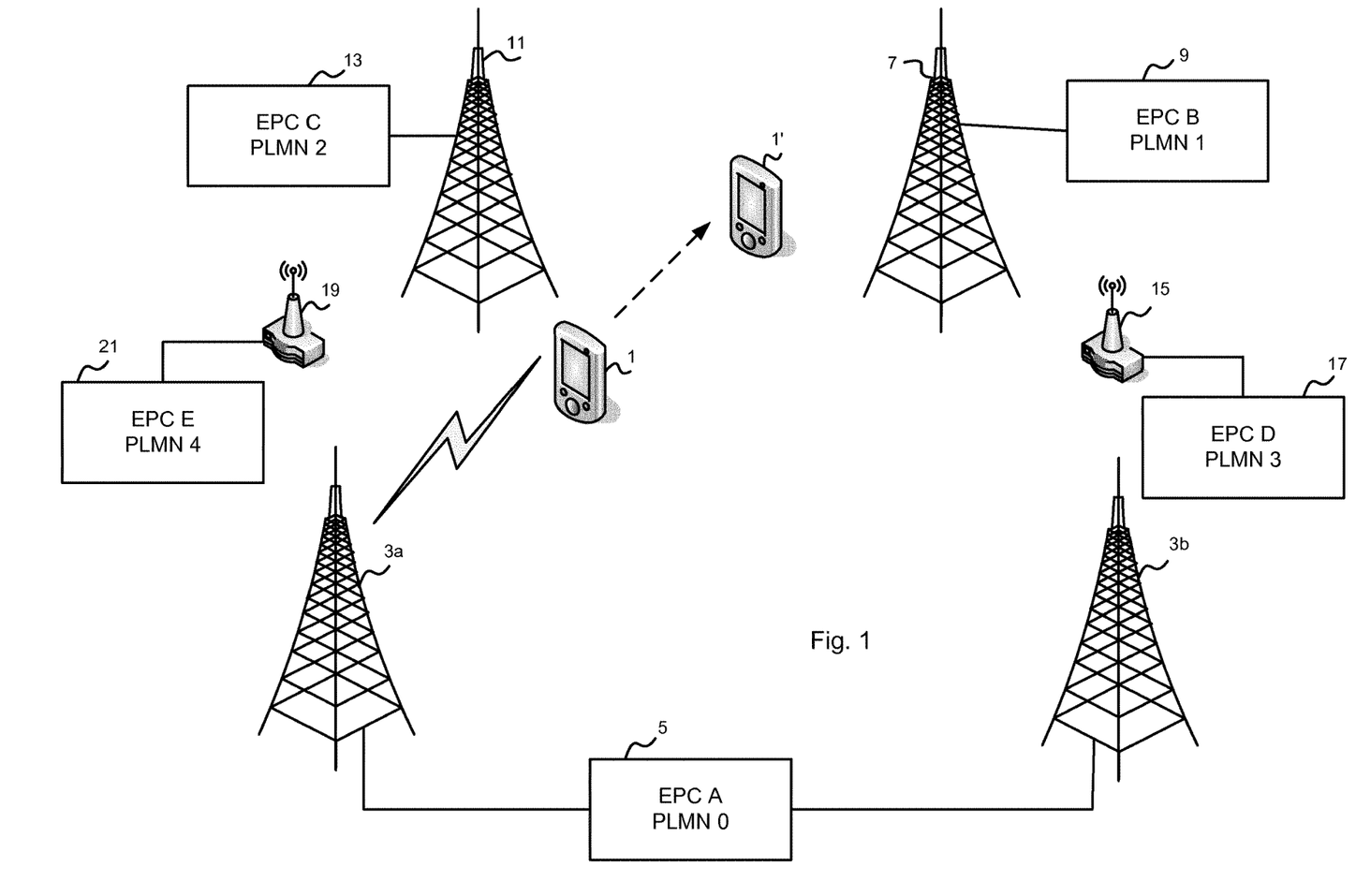
FIG. 1 shows an overview of a UE in a geographical area surrounded by a plurality of eNodeBs and connected in active mode to an eNodeB of a first PLMN.

FIG. 1 shows an example network in accordance with the first embodiment.

In FIG. 1, User equipment (UE) 1 is shown connected to a LTE network PLMN 0 formed of a number of eNodeBs 3 and an Evolved Packet Core 5. In particular the UE 1 is in active mode and has a radio link to a first eNodeB 3a for exchanging control plane and data plane data packets with the EPC 5.

A number of other PLMNs are also shown to be in the same geographic area as UE 1. There are two macrocell network PLMNs: PLMN 1 formed of a macrocell 7 attached to EPC B 9 and PLMN 2 formed of macrocell 11 attached to EPC C 13. There are also two small cell network PLMNs; PLMN 3 formed of small cell 15 attached to EPC D 17 and PLMN 4 formed of small cell 19 attached to EPC E 21. The range of each PLMN covers the geographic view shown in FIG. 1.

Therefore the UE 1 can see each of the PLMNs although conventionally, since it is a subscriber of PLMN 0, it will only connect to eNodeBs 3 for idle mode reselection and in active mode the connected eNodeB 3a will only handover to another eNodeB 3b of the same PLMN.

In FIG. 1, the UE 1 is mobile and is shown to move further away from the connected eNodeB 3a while still in active mode. The new location of the UE is denoted as 1'.

When the UE 1 enters active mode, the eNodeB 3a sends a measurement control request to the UE 1 with a set of parameters and thresholds relating to signal strength observed for surrounding eNodeBs. The UE 1' periodically measures signal characteristics of its surrounding area and when the thresholds have been met, the UE 1' sends observed identifier and signal strength data for surrounding eNodeBs because the connected eNodeB 3a is responsible for deciding when to handover the UE 1' to another eNodeB.

For example, the UE sends the following information to the ENodeB 3a for intra-frequency measurements, inter-frequency measurements and inter-RAT measurements:

Channel Quality Indicator measurements;
Reference Signal Received Power (RSRP); and
Reference Signal Received Quality (RSRQ).

In FIG. 1, the UE 1' will see eNodeBs 7, 11, 15, 19 from other PLMNs in addition to eNodeB 3b and send those measurements back to the eNodeB 3a. At eNodeB 3a, the standard processing is to identify the PLMN of each observed eNodeB 7, 11, 15, 19 and check whether they belong to the same PLMN as eNodeB 3a's PLMN or are an equivalent PLMN (ePLMN) as defined in a Handover Restriction List which sets out any PLMNs which can be treated in the same manner as the current PLMN for both handover and idle mode reselection. This is common where two PLMNs started as separate entities but have merged and therefore can be treated as a single network without having to rename all of the existing equipment.

In FIG. 1, since the observed PLMNs are not ePLMNs, the eNodeBs do not belong to the same PLMN as eNodeB 3a and so the eNodeB 3a discounts those eNodeBs as possible handover targets. It may however use the data for maintaining neighbor cell lists.

Therefore even though there are nearer and stronger eNodeBs in the new location of UE 1', eNodeB 3a will handover the UE 1' to eNodeB 3b of the same PLMN.

Figure 2:
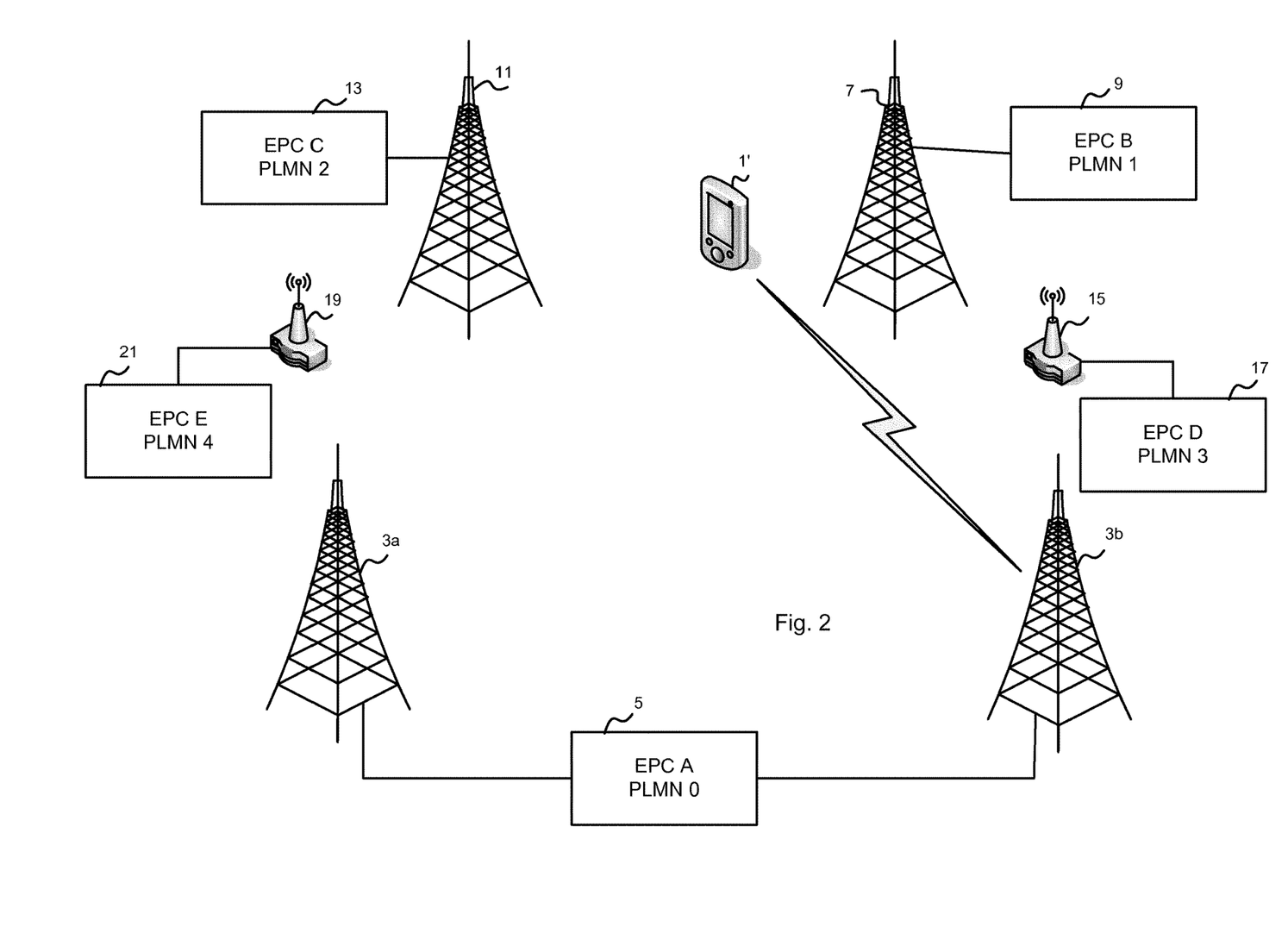
FIG. 2 shows the UE handed over to another eNodeB of the same PLMN.

FIG. 2 shows the network of FIG. 1 where the UE 1' in the new location is further away from the eNodeB 3a and the signal strength to eNodeB 3a has dropped sufficiently that eNodeB 3a decided to handover the UE 1' to another eNodeB 3b of the PLMN 0. Once a target eNodeB has been selection, the handover is carried out in accordance with the standard X2 or S1 handover processes.

In the first embodiment, the eNodeB 3 behavior is modified so that it can be more flexible in handover behavior. Instead of a static exclusion or static inclusion of other PLMN networks, the eNodeB can dynamically decide whether to handover a UE to an eNodeB belonging to another PLMN in accordance to current conditions such as time, the type of application running during the active mode, Quality of Service (QoS) Class Identifier (QCI), etc. In the first embodiment, commercial agreements are in place between the different PLMNs to allow partial access to other PLMNs.

The advantage of such dynamic handover behavior is that the UEs can be handled differently to maintain quality of experience by reacting to network conditions and the priority of each data session and at the same time balancing the costs of network sharing with other PLMNs.

For example, to provide more handover options, PLMN 0 may have commercial arrangements with PLMN 1, PLMN 2, PLMN 3 and PLMN 4 to allow limited handover opportunities between PLMNs. However due to the incurred costs for carrying traffic on a different network, the usage is restricted to selectively permit handover but maintain the restriction on idle mode reselection.

Figure 3:
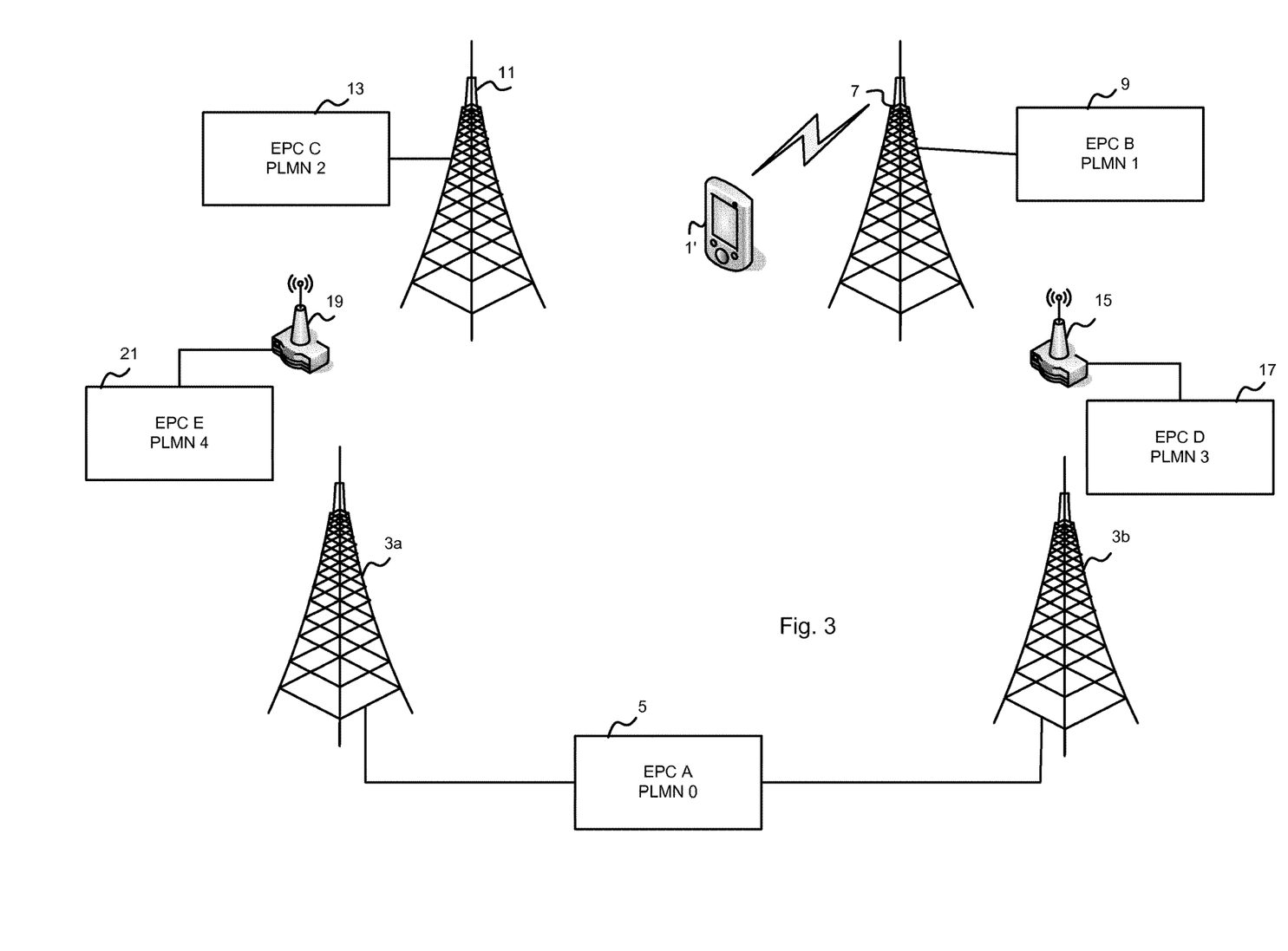
FIG. 3 shows the UE handed over to a different PLMN in accordance with a first embodiment.

FIG. 3 shows an example where the UE 1' has been handed over to eNodeB 7 because eNodeB 3a has determined that it can permit handover of the UE 1' to eNodeB 7 of PLMN 1 instead of eNodeB 3a of PLMN 0.

An example of a PLMN selection table used by the eNodeB 3 for the different PLMNs detected by the UE is shown below.

TABLE 1

| | Time of day | | VoLTE | Best efforts | Application type (capabilities) | |
|---|---|---|---|---|---|---|
| | | | Application (cost) | | | |
| PLMN ID | 9-12 | 12-00 | (QCI 1-5) | (QCI 8, 9) | Unicast | Multicast |
| PLMN 1 | Yes | No | No | Yes | Yes | No |
| PLMN 2 | Yes | No | No | Yes | Yes | No |
| PLMN 3 | No | Yes | Yes | Yes | No | Yes |
| PLMN 4 | No | Yes | Yes | Yes | No | Yes |

In order to determine which PLMNs are allowed for handover, the eNodeB 3 evaluates the current conditions such as time of day and the application properties against the rules set out in the table.

For example, in FIG. 3, it is 10 am and the UE 1 is running a low QCI, unicast application such as a file transfer. By evaluating the PLMN table, the eNodeB 3a determines that handover to PLMN 1 and PLMN 2 is available for handover in addition to an eNodeB on the current PLMN.

Having determined the three PLMN options the eNodeB 3a selects an eNodeB based on the signal strength and signal quality measurements returned from the UE measurement report. In this example the eNodeB determines that eNodeB 7 is the most suitable handover target and then initiates handover using the S1 interface.

For the same application but at a different time, such as 4 pm, then PLMN 1 and PLMN 2 would not be available. Similarly PLMN 3 and PLMN 4 are not available as they do not allow unicast applications. In this case, none of the surrounding PLMNs are available and therefore eNodeB 3a will handover to eNodeB 3b.

The eNodeB can be configured to use a single PLMN handover table for all subscribers, but to allow subscriber differentiation, in the first embodiment, different PLMN handover tables can be used by the eNodeB. For example, basic level subscribers cannot handover to any other PLMNs, average subscribers can use the table shown above and premium subscribers can access all other PLMNs at any time.

The process of allocating a PLMN handover table as well as updates will be explained in more detail below.

Figure 4:
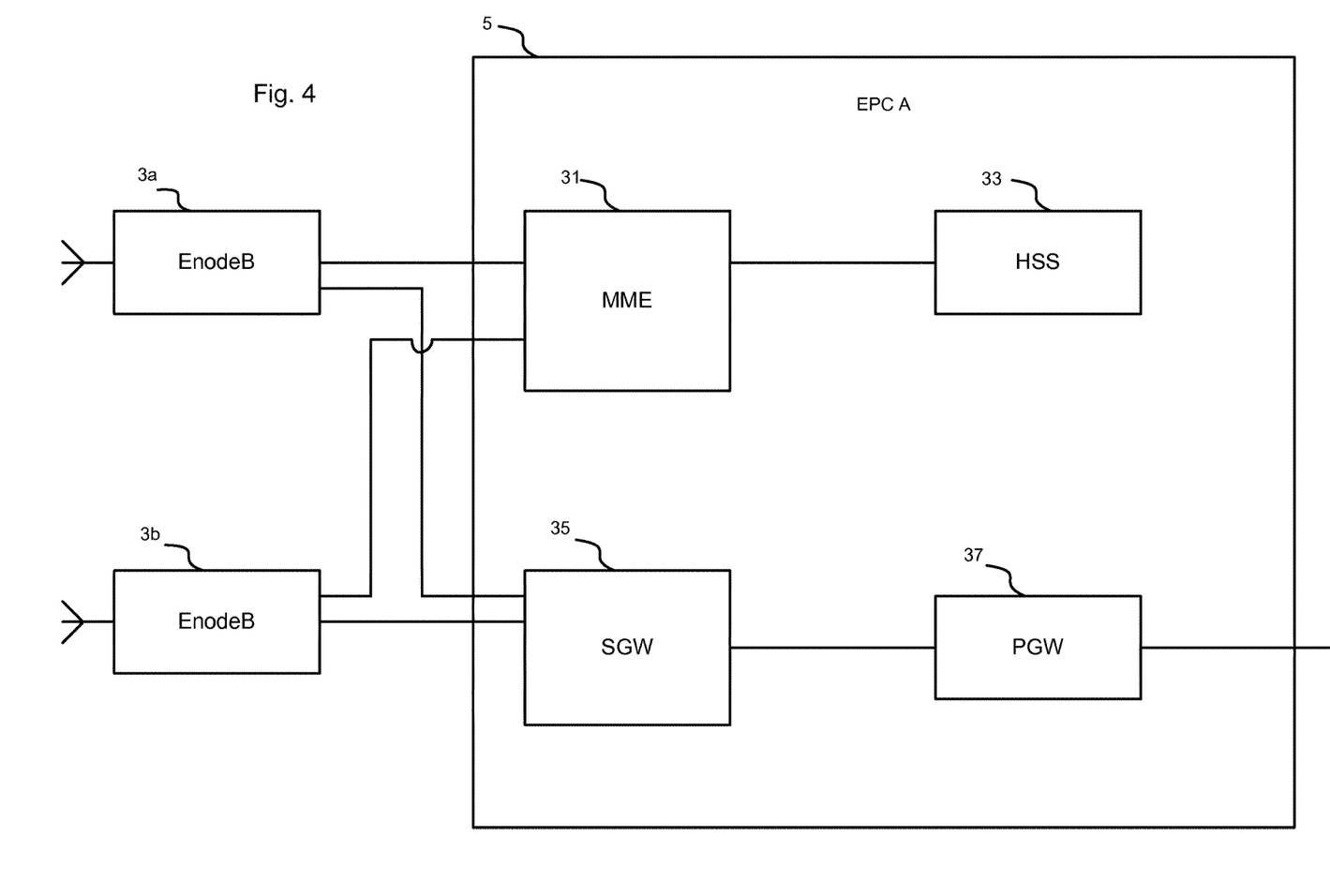
FIG. 4 shows the components of a first PLMN.

FIG. 4 shows the components of PLMN 0. In association with the eNodeBs 3, the EPC 5 contains a mobility management entity (MME) 31, Home Subscriber Server (HSS) 33, a Serving Gateway (SGW) 35 and a Packet Gateway (PGW) 37.

Core Components—MME and HSS

Figure 5:
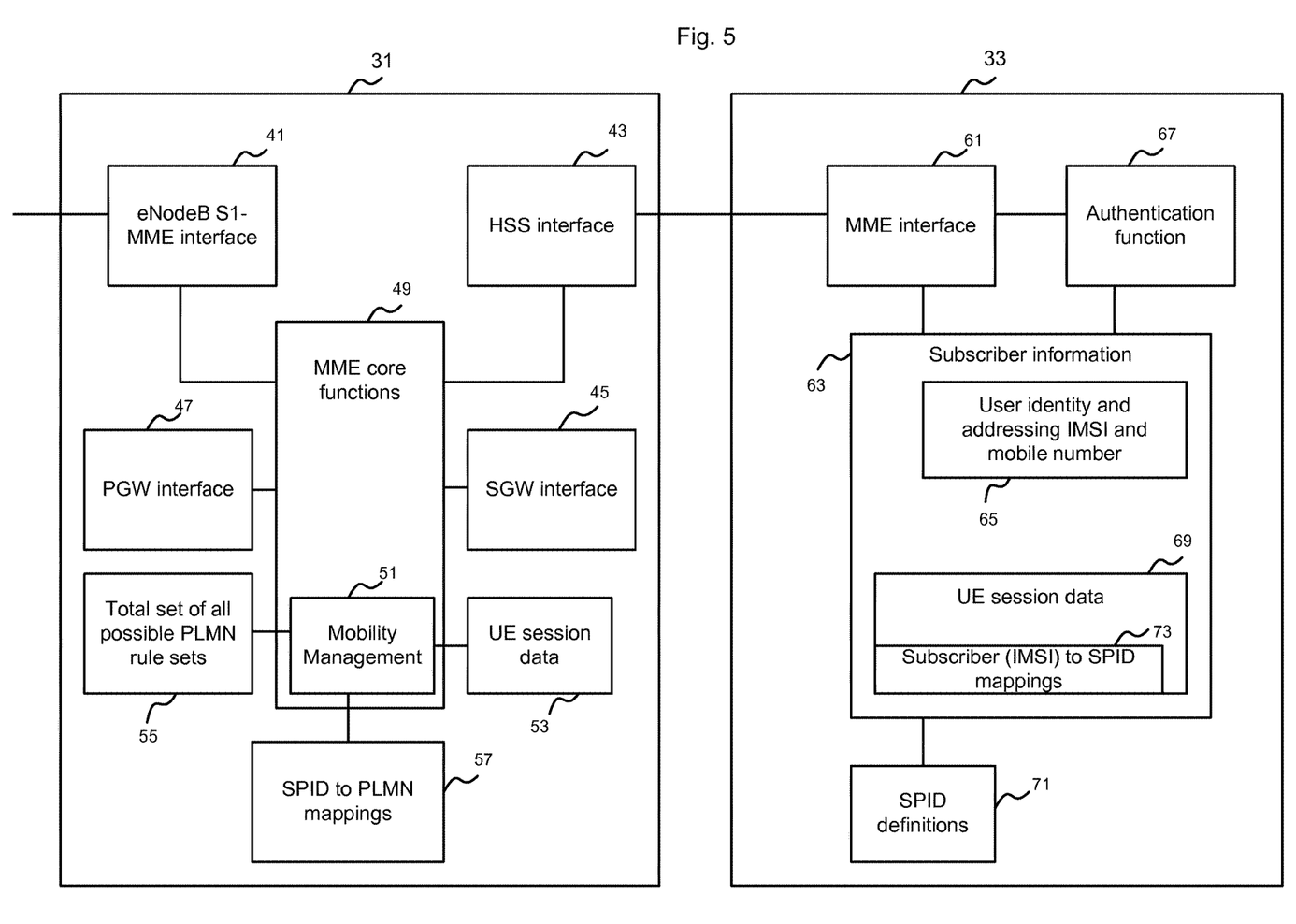
FIG. 5 shows the components of an MME and HSS shown in FIG. 4.

FIG. 5 shows the MME 31 and the HSS 33 in more details. The MME 31 is the main control node in the EPC 5 and is responsible for signal exchanges between eNodeBs 3 and the EPC 5 and between UEs 1 and the EPC 5. Operations include authentication of a UE 1 using information in the HSS 33, establishing bearers between the UE 1 and SGW 35 and PGW 37, Non-Access Stratum (NAS) mobility management, interworking support, handover support and supporting traditional services such as Circuit Switched Fall-Back (CSFB). The NAS mobility management is modified in the first embodiment.

For communication with other components in the network 5, the MME 31 contains a S1 interface 41 to the eNodeBs 1 in the network 5, a S6 interface 43 to the HSS 33, a S11 interface 45 to the SGW 35 and a S5 interface 47 to the PGW 37.

An MME management function 49 manages the communication between the interfaces 41, 43, 45, 47 for general control plane data exchanges.

As is conventional, the MME management function 49 includes functionality for:

Network Access Control;
Radio Resource Management;
Mobility Management;
Roaming Management;
UE-Reachability;
Tracking Area Management;
Lawful Interception; and
Load Balancing Between SGWs.

To implement the modifications to the handover behavior of the eNodeB 3, the mobility management function 51 which has access to the UE session data store 53 is modified to further access a data store storing the complete set of possible PLMN handover rules 55 as defined by a system administrator and a data store storing SPID to PLMN rule set mappings 57. These functions will be described in more detail later once the components of the HSS 33 and eNodeB 1 have been described.

HSS

The HSS 33 is linked to the MME 31 and provides the MME 31 with information relating to the subscribers of the network 5. For communication with the MME 31, the HSS 33 contains a complementary S1 interface 61 to the MME 31. A subscriber information store 63 is a database that stores information of every subscriber in the network 5. In FIG. 5, a first store 65 has long term subscriber information relating to user identity and addressing. This includes the IMSI and mobile number of the subscriber. While the values of these entries can change, it is not a very frequent occurrence and changes must be made by an administrator.

For example, a subscriber may order a replacement SIM card when upgrading to LTE network access, or port their number from another network.

Fields in the First Store Include:
IMSI—International Mobile Subscriber Identifier
NAM—Network access mode: defines whether the subscriber can access the circuit switched network, packet switched network or both.
Mobile Station International ISDN Number—the subscriber's telephone number linked to the IMSI The HSS 33 also contains a second store 69 within the subscriber information 63 relating to UE session data required to support call control and session management entities of different domains and subsystems. This temporary data may change through normal operation of the system.

An Example of the UE Session Data Store 69:
IMEI—International Mobile Equipment Identity of the UE;
Data relating to authentication and ciphering which is used by the authentication function;
identity of the current MME and/or SGW;
identity of current MSC (not shown) for circuit switched fall back calls;
packet switch properties such as Access Point name the subscriber is allowed to use.

In this embodiment, the subscribers are grouped according to subscriber types such as service level. The possible groups are described by Service Profile Identity (SPID) and are set by a system administrator in SPID definitions 71.

Example of SPID Definitions 71:

| SPID | Group |
| --- | --- |
| 50 | premium subscribers |
| 55 | medium subscribers |
| 59 | basic subscribers |
| 70 | roaming subscribers |

In this embodiment, at a coarse level of grouping, SPIDs in the range of 50 to 59 are defined for the various levels of home network subscriber UEs 1 and SPIDs outside of this range are for any roaming UEs connect to the network 5.

To associate a SPID to each of the subscribers that can join the network 5, the UE session data store 69 contains sets of IMSI to SPID mappings 73.

Example of the IMSI to SPID Mappings 73:

| IMSI | Service Profile Identity |
| --- | --- |
| IMSI#20 | SPID 50 |
| IMSI#1 | SPID 55 |
| IMSI#30 | SPID 59 |
| IMSI#40 | SPID 70 |

With these tables and associations, all possible subscribers of the network are grouped and this information is shared with the MME 31 when it reports a subscriber.

The HSS 33 further includes an Authentication function 67 for verifying the identity of new subscribers connecting to the network 5. This function uses information stored in the UE session data store 69 to generate challenge phrases to the UEs 1 based on public and private key encryption in order for the UE 1 to authenticate itself to the HSS 33 and also for the HSS 33 to authenticate its identity to the UE 1.

Once a UE 1 has been authenticated onto the network by the HSS 33, the SPID is sent to the eNodeB as part of the session setup data exchange.

MME

Returning to the MME 31, the Mobility management function 51 is responsible for processing the IMSI to SPID mappings for any connected UEs 1 and determining a respective PLMN handover processing. To implement this behavior, the operating information relating to each observed UE is held in UE session data 53 including an identification of the SPID assigned to each UE 1.

The complete set of possible PLMN selection rules sets used to define the handover behaviors of the eNodeBs are stored in the PLMN rules store 55.

Example of Parameter Sets:

| Rule identifier | rule set |
| --- | --- |
| 1 | rules set 1 |
| 2 | rules set 2 |
| 3 | rules set 3 |
| 4 | rules set 4 |

The Mobility Management function 41 associates the SPID assigned to a UE 1 and stores the association in SPID to PLMN rules set mappings 57.
Example of the Data Stored in the SPID to Parameter Mappings:

| ID | SPID | parameter set number |
| --- | --- | --- |
| 1 | 50 | rules set 1 |
| 2 | 55 | rules set 2 |
| 3 | 59 | rules set 3 |
| 4 | 70 | rules set 4 |

With this processing, in addition to having knowledge of the UEs in accordance with the core processing, the MME also has knowledge of the SPID to PLMN rule set mappings so that an eNodeB of the network 5 can be directed to carry out handover in different ways for different UEs.

Figure 6:
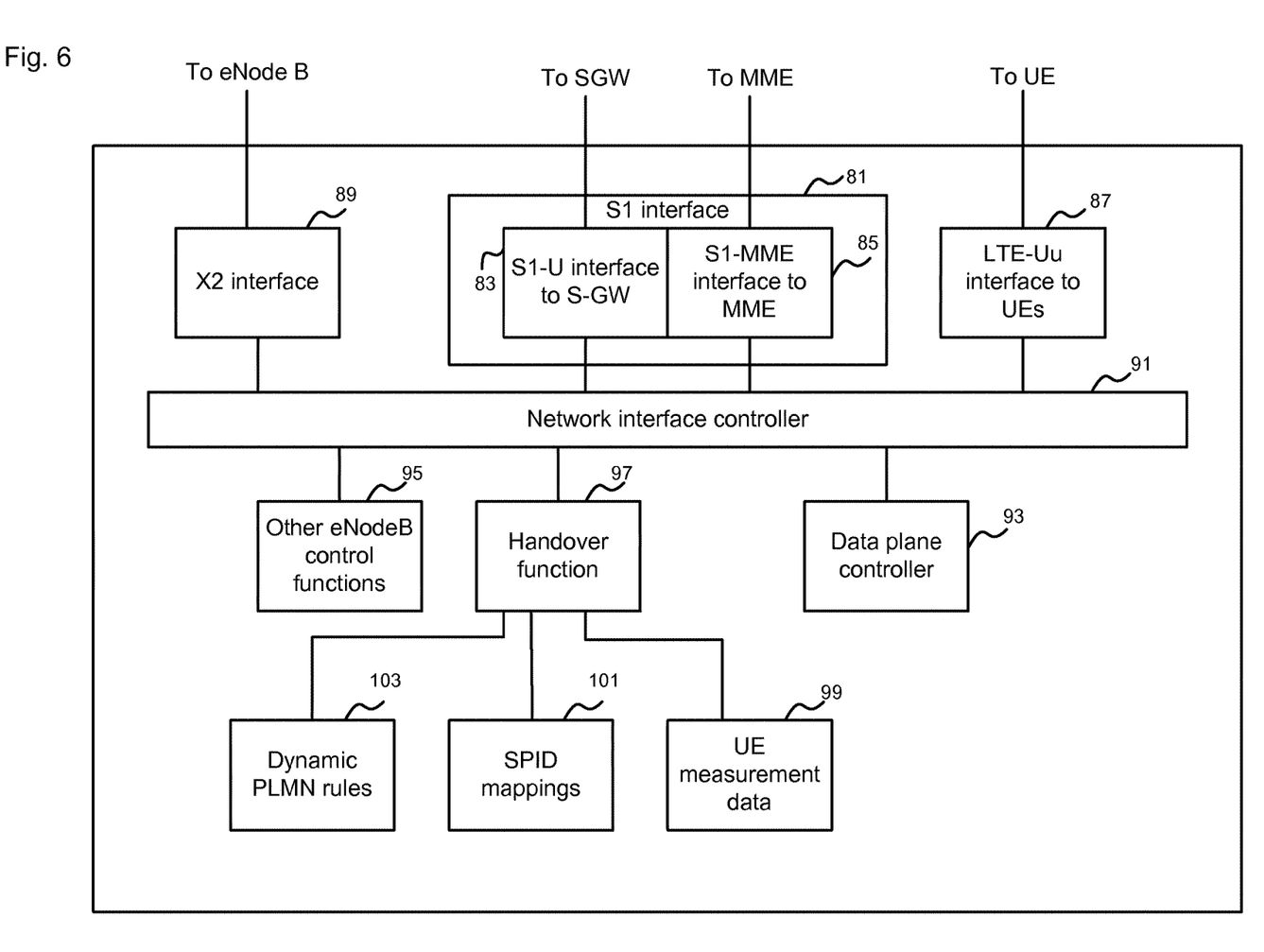
FIG. 6 shows the components of an eNodeB.

The rules for a UE can then be sent to the eNodeBs 3 handling that UE so that when the UE is in active mode and may need to handover, the eNodeB 3 can apply the associated PLMN rules to select a handover target on a particular PLMN. The eNodeBs are not sent the complete contents of the data in the MME to save processing. Only information relevant to an eNodeB's connected UEs are delivered.
Enode B FIG. 6 shows the functional components of an eNodeB 3 of the network in accordance with the first embodiment.

The eNodeB 3 contains a number of network interfaces for communication with the various network entities. Each interface is dedicated with a different class of network component, namely the MME 31, UEs 1 and other eNodeBs 3.

The S1 interface 81 is for communication with EPC components of the network 5. The S1 interface 81 can be split into control plane and data plane interfaces. The S1-MME interface 83 is for communication with the MME 31 handling the eNodeB 3 for control plane communication and the S1-U interface 85 is for communication with the Serving Gateway (S-GW) 35 for data plane communication.

The LTE-Uu interface 87 is for communication with connected UEs 1 in both active mode and idle mode.

The X2 interface 89 is for communication with other eNodeBs 3. This is generally used during handover for UEs 1 which are in active mode.

A network interface controller 91 coordinates the flow of control plane and data plane data between the various S1, X2 and LTE-Uu interfaces 81, 87, 89 and internal functions of the eNodeB such as a data plane controller 93, eNodeB control plane functions 95 and a handover function 97.

The data plane controller 93 coordinates communication data sessions between the UEs 1 connected via the LTE-Uu interface 87 and SGWs 35 via the S1-U interface 83.

The eNodeB control plane functions 95 directs processing of control plane information and coordinates communication between the MME 31, UEs 1 and other eNodeBs 3 via the S1-MME interface 85, LTE-Uu interface 87 and X2 interface 89 respectively.

Functions covered by the control plane functions include radio resource management, authentication and mobile mobility functions which are outside the scope of this invention.

The handover function 97 is responsible for handling the handover behavior for connected UEs in the active mode. The handover function 97 is connected to several data stores. A PLMN rule data store 103 containing sets of PLMN rules to be applied to the UEs in active mode. A mapping data store 101 contains mappings between a SPID and a set of PLMN rules.

The MME 31 provides the rule sets and mappings via the S1-MME interface 85 into the respective store 101, 103 whenever a UE enters into the active mode and connects to the eNodeB 9 with an RRC connection request so that resources are allocated by the eNodeB control functions 95 and a data session is established between the UE and MME 13 to establish control parameters for the data session. The MME 31 sends the SPID to the eNodeB so that the eNodeB can select the appropriate PLMN rule set during a UE handover.

In the example, only device 1 is connected to the eNodeB 3 and therefore the SPID mapping store 101 and PLMN rules data store 103 only contain information relevant to that particular UE 1.

Figure 7:
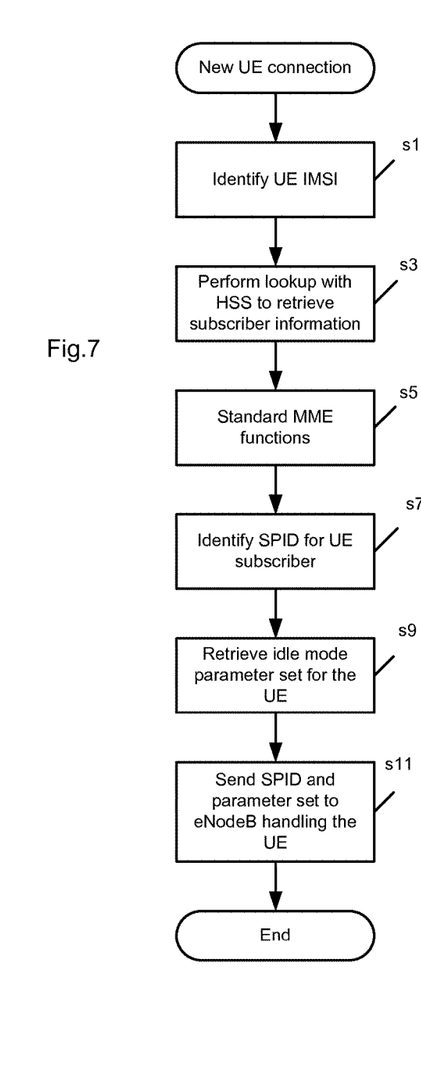
FIG. 7 is a flowchart showing the processing of an MME in a first embodiment.

FIG. 7 is a flowchart showing the operation of the MME 13 when a new UE connection is established to the network.

In s1, the UE 1 IMSI is recovered from the new connection information. In s3, the IMSI is used as a lookup into the HSS 33 to retrieve the subscriber information associated with the UE 1.

Standard MME functions are performed in s5 such as authentication, establishing UE subscriber state information and determining an SGW for the UE 1.

In accordance with the first embodiment, the MME is also configured to identify a SPID for the UE in s7 and in s9 the MME retrieves the PLMN rule set for the connected UE 1. Finally in s11 the SPID and PLMN rule set information is sent to the eNodeB 3.

After s11 the processing according to the first embodiment for sending handover behavior is complete although the MME is still responsible for handling the UE 1 while the UE 1 is in active mode.

Figure 8:
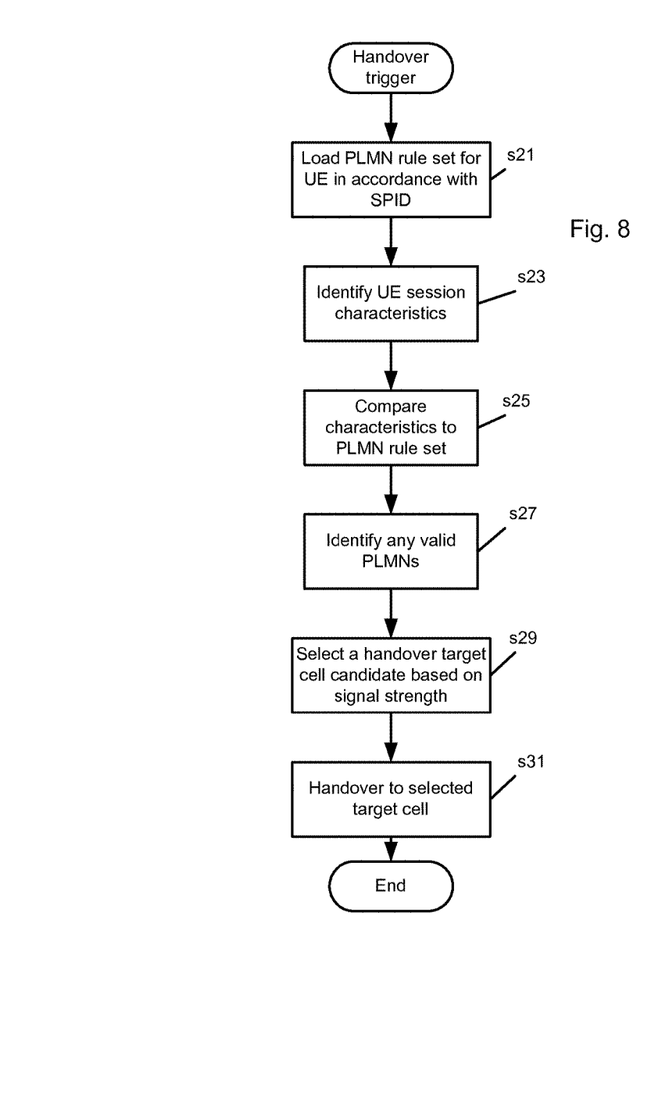
FIG. 8 is a flowchart showing the processing of an eNodeB in the first embodiment.

FIG. 8 is a flowchart showing the processing of the eNodeB during handover. In response to a handover trigger caused by the reception of a UE measurement report into UE measurement data store 99, in s21, the handover function 97 determines the SPID for the UE from the MME and uses the SPID to PLMN rules mapping store 101 to identify a PLMN rule set from rules store 103.

In s23, the handover function 97 identifies the UE session characteristics and other features such as the time of day. In s25 the identified characteristics for the UE session and the retrieved PLMN rule set are compared so that in s27 any valid PLMNs can be identified. If there are no further PLMNs available, then as is conventional only eNodeBs belonging to the same PLMN will be valid.

In s29, based on the identified valid PLMNs, a handover target cell is identified from surrounding eNodeBs detected by the UE and in s31 the handover function initiates a handover to the target eNodeB using the X2 handover or S2 handover.

With the above processing, the handover behavior for groups of UEs can be modified to allow handover to different PLMNs in certain circumstances. The eNodeB can dynamically handover UEs in accordance with stored rules received from the MME so that there is a greater choice of handover targets. Furthermore, the idle mode reselection behavior of the UEs is not affected so that costs and network resources are not excessive.

ALTERNATIVES AND MODIFICATIONS

In one embodiment, the PLMN processing is carried out before target cell selection on the basis of the time of day and the application type so that the eNodeB knows which alternative PLMNs are available before analyzing the results of the UE cell scan. In an alternative, a target eNodeB is selected based on signal strength before an evaluation of whether the PLMN of the eNodeB is a valid handover is performed.

In one embodiment, an LTE network is described. However, the handover processing is not limited to such networks and in alternatives the handover processing is present in a UMTS, GSM or other cellular network.

In one embodiment, the UE is connected to a macrocell eNodeB and the handover is to a macrocell network. The processing of the MME and eNodeB can be configured to fit different network configurations. In an alternative, a macrocell network and a small cell network have a commercial agreement whereby the macrocell network is used to fill in gaps in network coverage caused by the restricted range of small cells (picocells and femtocells) in the small cell network. It is therefore desirable for subscriber UEs of the small cell network to be able to access both the small cell network eNodeBs and the macrocell network eNodeBs, but maintain a restriction that subscriber UEs of the macrocell network can only access the macrocell network.

Since the macrocell network and the small cell network do not share the same PLMN and they cannot be considered as equivalent PLMNs, the processing of the MME and eNodeB of the first embodiment can be applied to enable the eNodeB of the macrocell to handover UEs belonging to the small cell network when available.

Similarly, the MME and eNodeB of the macrocell network can be configured to allow a handover of macrocell subscriber UEs to the small cell network in a more restricted set of circumstances.

The invention claimed is:

1. A method of inter network cellular device handover between a plurality of cellular communications networks, each of the plurality of cellular communications networks having at least one base station carrying an identifier for its respective network, the method comprising one of the at least one base station of one of the plurality of cellular communications networks performing the following:

requesting a measurement report from a connected cellular device;

accessing a permissions list associated with the cellular device, the permissions list defining permissions for handover to different cellular networks;

determining which cellular networks are permitted in accordance with the permissions and current operating parameters of the cellular device, wherein the permissions list includes rules relating to access in accordance with a type of data session, the type of data session including application properties, in which the data session is a packet-switched data session, operating on the cellular device with any external network resources and rules relating to access in accordance with a time of day;

selecting a target base station of a different cellular network in dependence on the measurement report and the permissions list; and establishing communication with the selected target base station to handover the cellular device.

2. The method according to claim 1, wherein a plurality of permissions lists are available, and the method further comprises selecting one of the plurality of permissions lists in accordance with a subscriber group associated with the cellular device.

3. An apparatus for providing inter network cellular device handover between a plurality of cellular communications networks, each of the plurality of cellular communications networks having at least one base station carrying an identifier for its respective network, the apparatus being connected to a cellular device and comprising:

a transceiver for requesting a measurement report from the connected cellular device;

an interrogator for accessing a permissions list associated with the cellular device, the permissions list defining permissions for handover to different cellular networks;

a processor for determining which cellular networks are permitted in accordance with the permissions and current operating parameters of the cellular device, wherein the permissions list includes rules relating to access in accordance with a type of data session, the type of data session including application properties, in which the data session is a packet-switched data session, operating on the cellular device with any external network resources and rules relating to access in accordance with a time of day, and selecting a target base station of a different cellular network in dependence on the measurement report and the permissions list; and a controller for performing handover so as to establish communication with the selected target base station to handover the cellular device.

4. The apparatus according to claim 3, wherein a plurality of permissions lists are available, and the processor is further configured to select one of the plurality of permissions lists in accordance with a subscriber group associated with the cellular device.

* * * * *